US006362449B1

(12) United States Patent
Hadidi et al.

(10) Patent No.: US 6,362,449 B1
(45) Date of Patent: Mar. 26, 2002

(54) VERY HIGH POWER MICROWAVE-INDUCED PLASMA

(75) Inventors: Kamal Hadidi, Cambridge; Paul Woskov, Bedford, both of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/133,063

(22) Filed: Aug. 12, 1998

(51) Int. Cl.[7] ................................................ B23K 10/00

(52) U.S. Cl. ............................ 219/121.36; 219/121.48; 356/316

(58) Field of Search ........................ 219/121.36, 121.48, 219/121.52, 693, 695; 204/164, 298, 298.38; 156/345; 118/723 ME, 723 MW; 427/571; 315/4; 65/134.7; 75/10.19; 356/316; 423/446; 333/99 PL; 374/126; 343/772

(56) References Cited

U.S. PATENT DOCUMENTS 3,577,207 A 5/1971 Pavlovich
3,872,349 A 3/1975 Spero et al.
3,911,318 A 10/1975 Spero et al.
4,507,587 A 3/1985 Wood et al.
5,003,152 A 3/1991 Matsuo et al.
5,111,111 A 5/1992 Stevens et al.
5,200,722 A 4/1993 Wolf
5,301,203 A 4/1994 Schlie et al.
5,313,179 A 5/1994 Moeller
5,400,004 A 3/1995 Moeller
5,449,412 A 9/1995 Pinneo
5,468,356 A 11/1995 Uhm
5,478,532 A 12/1995 Uhm
5,521,360 A 5/1996 Johnson et al.
5,583,524 A * 12/1996 Milroy ....................... 343/772
5,671,045 A 9/1997 Woskov et al.
5,785,426 A * 7/1998 Woskov et al. ............. 374/126
5,825,485 A * 10/1998 Cohn et al. ................. 356/316
5,958,264 A * 9/1999 Tsantrizos et al. ..... 219/121.38
5,973,289 A * 10/1999 Read et al. ............ 219/121.48

FOREIGN PATENT DOCUMENTS

DE 19605518 A1 9/1997
FR 2591412 A1 11/1987
JP 4-351899 12/1992
JP 8-75128 3/1996
RU 2082284 C1 6/1997

OTHER PUBLICATIONS

V. Siemens, T. Harju, T. Laitinen, K. Larajave, and J. A. C. Broekaert, "Applicability of Microwave Induced Plasma Optical Emission Spectrometry (MIP–OES) for Continuous Monitoring of Mercury in Flue Gases," *Fresenius. J. Anal. Chem.* 351:11–18 (1995).

A. V. Timofeev, "Theory of Microwave Discharges at Atmospheric Pressures," *Plasma Physics Reports* 23(2):158–164 (1997).

J. D. Corbine and D. A. Wilbur, "The Electronic Torch and Related High Frequency Phenomena," *J. App. Phys.* 22(6):835–841 (1951).

(List continued on next page.)

*Primary Examiner*—Teresa Wahlberg
*Assistant Examiner*—Quang Van
(74) *Attorney, Agent, or Firm*—Choate, Hall & Stewart

(57) ABSTRACT

High power microwave plasma torch. The torch includes a source of microwave energy which is propagated by a waveguide. The waveguide has no structural restrictions between the source of microwave energy and the plasma to effect resonance. The gas flows across the waveguide and microwave energy is coupled into the gas to create a plasma. At least 5 kilowatts of microwave energy is coupled into the gas. It is preferred that the waveguide be a fundamental mode waveguide or a quasi-optical overmoded waveguide. In one embodiment, the plasma torch is used in a furnace for heating a material within the furnace.

1 Claim, 5 Drawing Sheets-

OTHER PUBLICATIONS

M. Mosian and Z. Zakrzewski, "Plasma Sources Based on the Propagation of Electromagnetic Surface Waves," *J. Phys. D: App. Phys.* 24:1025–1048 (1991).

Stefan Kirschaner, Alfred Golloch, and Ursula Telgheder, "First Investigations for the Development of a Microwave–Induced Plasma Atomic Emission Spectrometry System to Determine Trace Metals in Gases," *J. Anal. Atomic Spectrometry* 9:971–974 (1994).

John E. Brandeburg and John F. Kline, "Experimental Investigation of Large–Volume PIA Plasmas at Atmospheric Pressure," *IEEE Transactions on Plasma Science* 26(2):145–149 (1998).

A. E.Croslyn, B.W. Smith, and J. D. Winefordner, "A Review of Microwave Plasma Sources in Atomic Emission Spectrometry: Literature from 1985 to the Present," *Critical Reviews in Analytical Chemistry* 27(3):199–255 (1997).

Jinsong Zhang, Lihua Cao, Yongjin Yang, Yunxiang Diao, and Xuexuan Shen, "Step Sintering of Microwave Heating and Microwave Plasma Heating for Ceramics," May, 1998; 6 pages.

Pierre Fauchais and Armelle Vardelle, "Thermal Plasmas," Dec. 1997, IEEE Transactions on Plasma Science, vol. 25, No. 6; 23 pages.

* cited by examiner

VERY HIGH POWER MICROWAVE-INDUCED PLASMA

TECHNICAL FIELD

This invention relates to apparatus for generating very high power plasmas, and more specifically to such apparatus for generating very high power plasmas induced by microwave electromagnetic radiation with high levels of microwave power coupled into the plasma.

BACKGROUND OF THE INVENTION

Most current thermo-plasma technologies are electrically generated and can be characterized either as direct current (DC) or alternating current (AC) plasma arcs requiring electrodes, or as electrodeless radio frequency (RF) induced plasma torches.

DC and AC arcs become plasma torches when the electric arc is blown out by rapid gas flow. The electrodes in DC and AC generated arcs have a limited lifetime. Thus, they require frequent replacement which increases costs and maintenance and reduces reliability. During material processing, eroded material from the electrodes in DC and AC plasma arc technologies can contaminate materials that require high purity. Some plasma arc systems use metallic electrodes cooled by water. Water cooling, however, increases the lifetime of the electrodes to only a few hundred hours and electrode erosion still contaminates processed material. Furthermore, the water introduces a safety concern because water leaking into the plasma can produce an explosion. Plasma arc systems that use graphite electrodes can operate only in a non-oxidizing environment, otherwise the electrodes burn up. Even if the graphite electrode system is purged of oxygen, oxidizing material can be introduced by the materials being treated, e.g., wet municipal waste or hydrocarbon plastics.

RF induced plasmas are relatively inefficient in coupling RF power into the plasma. High power RF induction torches typically have coupling efficiencies of less than fifty percent. In addition, radiated RF power from the induction coil must be shielded for safety. This shielding prevents the possibility of combining RF torches to increase power.

Known microwave-induced plasma generators, like those that are RF induced, are electrodeless, and avoid material contamination and electrode maintenance problems. Thus, they are cleaner, more reliable, and more cost effective. However, physical principles expressed in the prior art would lead to a conclusion that maximum power was limited by requirements of minimum plasma skin depth, i.e., the length over which plasma absorbs power. Thus, conventional wisdom assumed the maximum power and the maximum dimensions of microwave-induced plasma generators to be limited. U.S. Pat. No. 5,671,045 issued Sep. 23, 1997, provides such an example of a microwave-induced plasma generator with limited power and dimension.

U.S. Pat. No. 5,468,356 issued Nov. 21, 1995, discloses a microwave plasma generator using eight kilowatts of microwave power. The waveguide structure, however, includes a cavity to concentrate microwave power and facilitate plasma startup. Waveguide restrictions that effect microwave resonance, e.g., cavities and antennae, limit maximum useable microwave power unlike a fundamental mode waveguide or a quasi-optical overmoded waveguide without restrictions between the microwave source of power and plasma.

Jinsong Zhang, et al., “Step Sintering of Microwave Heating and Microwave Plasma Heating for Ceramics,”

*Institute of Metal Research*, Chinese Academy of Sciences (1998), describes a microwave-induced plasma using no more than ten kilowatts of power input into the microwave generator. Based on a private conversation between the authors of the paper and one of the inventors herein, the authors indicated that the coupling efficiency did not exceed forty percent. Thus, power coupled into the plasma does not exceed four kilowatts. Furthermore, this embodiment does not have unlimited maximum power, because there is a danger of arcing with the internal antenna.

In the global effort to protect the environment, there exists the need to minimize waste production in manufacturing and to improve waste destruction processes. Legislation now discourages landfill for all but the least hazardous materials. Thus, there is a strong shift towards incineration. Incineration, widely used for waste destruction, is a chemical combustion process requiring fuel and large quantities of air. Environmental groups state that many new toxic products are formed in incineration, and these and other unwanted materials are present in the effluent steams of even the most modern incinerators. In addition, incinerators cannot reduce the volume of waste composed of certain kinds of materials, such as metal.

Electrically generated plasmas offer the advantage of higher operating temperatures for more complete and universal waste destruction, significantly reducing the volume of off-gas emissions and off-gas toxic compounds. DC and AC plasma arc technologies have been around for almost a century and are used in many thermal processes including waste destruction and materials manufacturing. But, DC and AC plasma arc technologies have not yet replaced incineration for waste destruction because, among other reasons, their reliability and maintenance costs are unproven in commercial use.

Since RF induced plasma technology does not require electrodes, it is presently used in manufacturing processes where electrode contamination cannot be tolerated, such as the semiconductor and fiber optics industries. However, RF induced plasmas have limited maximum achievable coupling efficiency levels of 40–60% which decrease with power. Thus, their applications are limited to processes with low power requirements. The limited maximum achievable efficiency rules out their use in waste destruction.

There exists a need for reliable and cost effective plasma torches that can be scaled to unlimited power outputs as compared to existing plasma generators. Furthermore, there is also a need for such very high power plasma torches to have a high level of coupling efficiency. In many manufacturing applications, there is also a need to limit contamination by the plasma apparatus.

SUMMARY OF THE INVENTION

In accordance with the above, one aspect of the invention is a high power microwave plasma torch which includes a source of microwave energy which is propagated by a waveguide. The waveguide has no structural restrictions effecting resonance and is configured such that at least five kilowatts of microwave power is coupled into a gas flowing through the waveguide to create a plasma.

In one embodiment, the waveguide is a fundamental mode waveguide. In a preferred embodiment, the maximum internal dimension of the waveguide is less than the wavelength of the microwave energy. The fundamental mode waveguide can be constructed of electrically conducting walls which are smooth. In a preferred embodiment, the fundamental mode waveguide is shorted to facilitate plasma startup. A dielectric tube, transparent to microwaves, can traverse the fundamental mode waveguide to contain the gas flow. In one embodiment, the dielectric tube traverses the fundamental mode waveguide ¼ of the microwave wavelength back from the short.

In an alternative embodiment of the invention, the waveguide is a quasi-optical overmoded waveguide. In a preferred embodiment, the minimum internal dimension of the quasi-optical overmoded waveguide is greater than the wavelength of the microwave energy. The internal walls of a quasi-optical overmoded waveguide can be constructed of either corrugated, electrically conducting material or of a smooth, non-conducting material. The quasi-optical overmoded waveguide can be adapted to propagate in the $HE_{11}$ mode. In a preferred embodiment, a focusing mirror at one end of the quasi-optical overmoded waveguide facilitates plasma startup. A dielectric tube, transparent to microwaves, can traverse the quasi-optical overmoded waveguide to contain the gas flow. In a further embodiment, the dielectric tube traverses the overmoded waveguide at the focus of the focusing mirror.

The preferred embodiment of the invention also includes a reflected power protector to protect the microwave generator from returned power. In one embodiment, the reflected power protector is a waveguide circulator or a waveguide isolator.

In an alternative embodiment, this invention includes a microwave energy source and a waveguide to propagate the microwave energy. The waveguide is configured such that at least eight kilowatts of microwave power are coupled into a gas flowing through the waveguide to create a plasma.

Another aspect of the invention is a high power microwave energy plasma torch including a source of microwave energy of more than ten kilowatts and a waveguide to propagate and couple the microwave energy into a gas flowing through the waveguide to create a plasma.

In one aspect, the invention is a plasma torch furnace including an enclosed furnace chamber with a feed port for introducing waste. The waste is treated by at least one microwave plasma torch of the type described above. The furnace chamber can include an exhaust port with its own optional plasma torch for treating off-gases. The furnace chamber can also include a pouring port for removing molten waste.

Alternatively, the invention is a material processing apparatus including a microwave plasma torch of the type described above and a feed port for introducing feed material for processing. The feed port can feed the material into the gas flowing through an optional dielectric tube or into the plasma torch directly.

In an alternative embodiment of the invention, at least two plasma torches of the types described above can be integrated into a single dielectric tube to create a columnar plasma torch.

The foregoing and other objects, features, and advantages of the invention will be apparent from the following more particular description of preferred embodiments of the invention as illustrated in the accompanying drawings.

DETAILED DESCRIPTION

The present invention provides a microwave induced plasma torch that is more reliable, efficient, economical, and scalable to very high power levels by configuring the waveguide dimensions within limits determined by the microwave wavelength.

Figure 1:
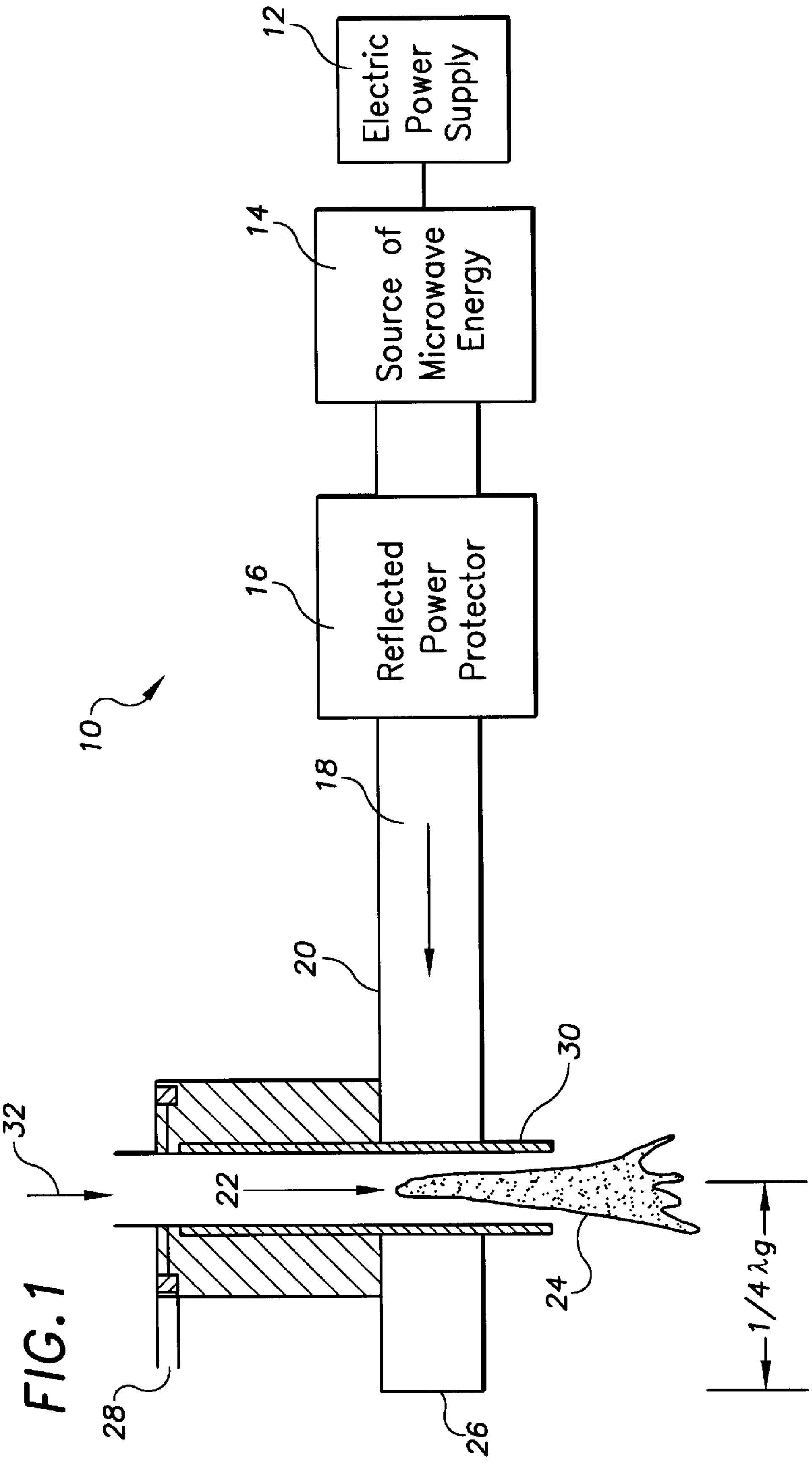
FIG. 1 is a cross-sectional view of a fundamental mode waveguide microwave torch.

FIG. 1 illustrates one embodiment of a plasma torch 10 in accordance with the present invention. The plasma torch 10 includes a source of microwave energy 14; a fundamental mode waveguide 20; and a gas flow 22. An electric power supply 12 provides power to the source of microwave energy 14. Suitable sources of microwave energy 14 are known in the art and could be a magnetron, klystron, gyrotron, or other type of high power microwave source. Magnetrons at frequencies of 0.915 and 2.45 Gigahertz are presently available at output power levels of approximately 100 kilowatts and could be the basis of a cost competitive microwave plasma torch 10.

Plasma torch 10 can also include a reflected power protector 16 to protect the source of microwave energy 14 from returned power. The reflected power protector 16 could be a waveguide circulator that would deflect any reflected microwave energy to a water-cooled dump (not shown). Alternatively, the reflected power protector 16 could be a waveguide isolator that would return the reflected power to a plasma 24.

The source of microwave energy 14 provides microwave energy 18 to be propagated through the fundamental mode waveguide 20. The microwave energy 18 is then coupled into the gas flow 22 to create the plasma 24. Substantially all of the microwave energy 18 is either absorbed by the plasma 24 or confined within the compact waveguide 20, thus, there is no safety problem with radiated power. Combining multiple microwave plasma torches 10 to achieve higher power is also possible with this technology since interference between adjacent plasmas 24 is not a problem.

Referring still to FIG. 1, the fundamental mode waveguide 20 is constructed of smooth, electrically conducting walls to propagate the microwave energy 18. If the fundamental mode waveguide 20 is cooled by a cooling unit (not shown), a suitable material such as copper or brass may be used for the fundamental mode waveguide 20. If the fundamental mode waveguide 20 is not cooled, a suitable material such as carbon steel may be used for the fundamental mode waveguide 20. If the fundamental mode waveguide 20 is kept in a non-oxidizing environment, a suitable material such as graphite may be used for the fundamental mode waveguide 20. The fundamental mode waveguide 20 can be tapered to adjust microwave power density. The fundamental mode waveguide 20 has a maximum internal dimension less than the wavelength of the microwave energy 18. If the fundamental mode waveguide 20 is constructed with a rectangular cross-section, the maximum internal width should be less than the wavelength of the microwave energy 18. If the fundamental mode waveguide 20 is constructed with a circular cross-section, the maximum internal diameter should be less than the wavelength of the microwave energy 18. It is the wavelength limit on the dimensions of the fundamental mode waveguide 20 that limits the maximum operating power of the source of microwave energy 14, otherwise the microwave energy 18 will breakdown rather than propagate through the fundamental mode waveguide 20. This power restriction becomes more severe with shorter microwave wavelengths, i.e., higher frequencies. Thus, the fundamental mode waveguide 20 is more suitable for frequencies in the lower microwave range. The fundamental mode waveguide 20 should have no internal structural restrictions between the reflected power protector 16 and the plasma 24, e.g., cavities or antennae, to effect resonance. The fundamental mode waveguide 20 can have a short 26 at the end beyond the plasma to reflect all or substantially all of the microwave power back on itself to facilitate plasma 24 initiation. The reflected and forward microwave energy 18 create a peak in the microwave electric field intensity one quarter of the microwave energy 18 wavelength, $\frac{1}{4}\lambda_g$, back from the short 26. The plasma 24 will form at this peak in the microwave electric field. The efficiency at which microwave energy 18 couples into the gas flow 22 to create the plasma 24 is greater than 90% and can approach 100% with proper design.

Figure 2:
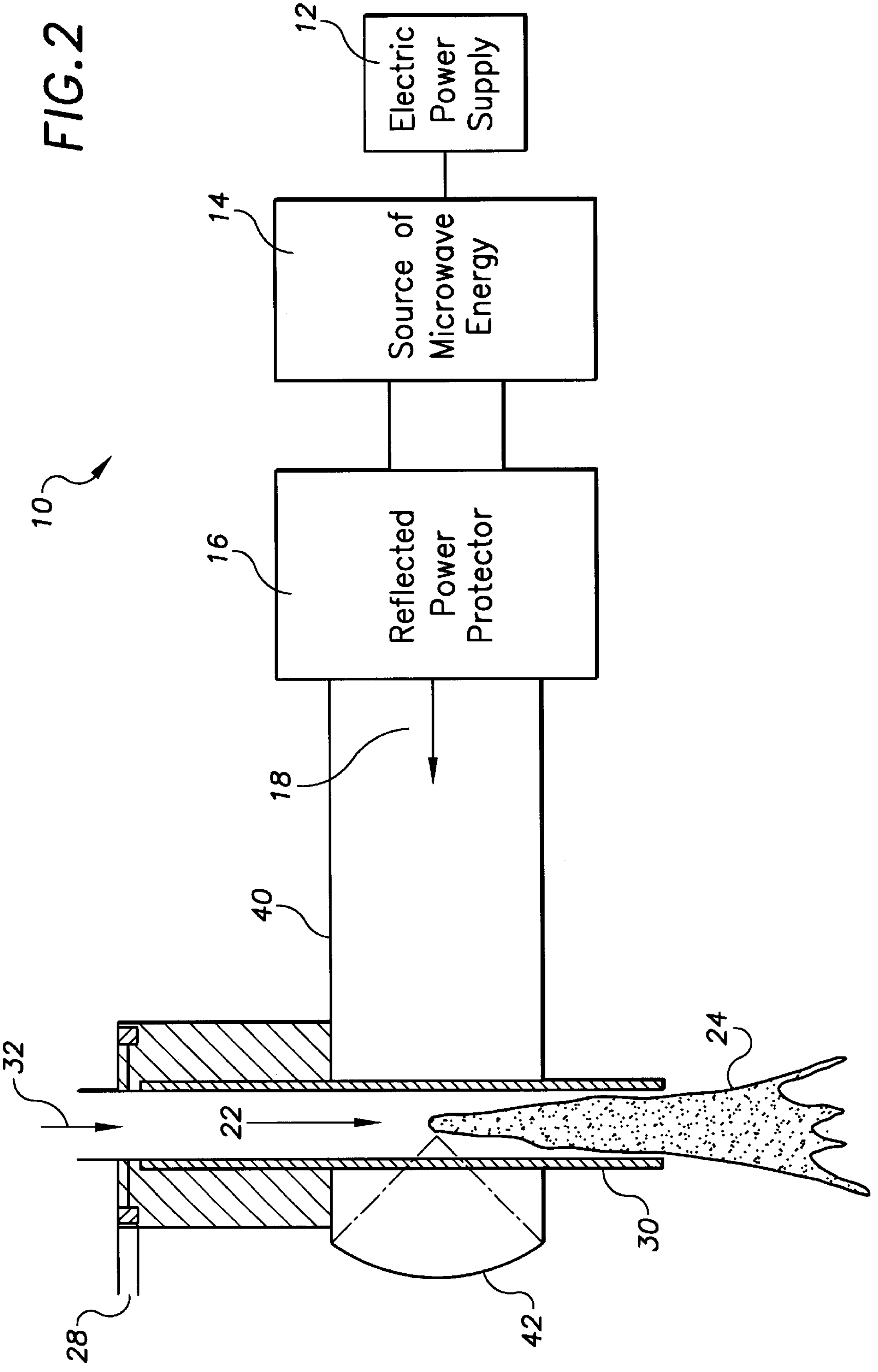
FIG. 2 is a cross-sectional view of a quasi-optical overmoded waveguide microwave torch.

FIG. 2 illustrates another embodiment of a plasma torch 10 operating in substantially the same manner as the plasma torch described with respect to FIG. 1. The reference numerals used in FIG. 1 correspond to those used in FIG. 2 and the remainder of the figures. Rather than using a fundamental mode waveguide 20 to propagate and couple the microwave energy 18 into the gas flow 22, FIG. 2 illustrates a quasi-optical overmoded waveguide 40. A plasma torch 10 with the quasi-optical overmoded waveguide 40 would have no theoretical upper limit on power levels at any frequency. Power levels in the megawatt range could be achieved for a single torch.

The quasi-optical overmoded waveguide 40 (which may be tapered to adjust microwave/millimeter-wave power density) has a minimum internal dimension greater than the wavelength of the microwave energy 18. The minimum internal diameter of a circular quasi-optical overmoded waveguide 40 must be greater than the wavelength of the microwave energy 18. A rectangular quasi-optical overmoded waveguide is also possible with the minimum width of the rectangular cross-section greater than the wavelength of the microwave energy 18. The quasi-optical overmoded waveguide 40 can be constructed of corrugated, electrically conducting internal walls or of smooth, nonconducting internal walls. The corrugations are known in the art and can be designed such that the surface properties along the direction of microwave energy 18 are similar to a dielectric material as shown by J. L. Doane, "Propagation and Mode Coupling in Corrugated and Smooth-Walled Circular Waveguides," Chapter 5, *Infrared and Millimeter Waves*, Vol. 13, Ken Button ed., Academic Press, Inc., New York (1985). This method can propagate microwave energy 18 in the $HE_{11}$ mode. The quasi-optical overmoded waveguide 40 should have no internal restrictions between the reflected power protector 16 and the plasma 24, e.g., cavities or antennae, to effect resonance or to limit maximum power density. The quasi-optical overmoded waveguide 40 has a focusing mirror 42 at one end to reflect the microwave energy 18 back to facilitate plasma 24 initiation. A preferred quasi-optical overmoded waveguide 40 is circular and constructed of corrugated, metallic material due to its higher efficiency and more readily available circular optics for the focusing mirror 42. The efficiency at which microwave energy 18 couples into the gas flow 22 to create the plasma 24 is greater than 90% and can approach 100% with proper design.

Referring to FIGS. 1 and 2, the fundamental mode waveguide 20 and the quasi-optical overmoded waveguide 40 can operate at a predetermined reference pressure, for example, ambient atmospheric pressure, a substantial vacuum, or higher than atmospheric pressure.

The plasma torch 10 can also include a dielectric tube 30, penetrating either the fundamental mode waveguide 20 or the quasi-optical overmoded waveguide 40. A variety of materials may be suitable for use in the dielectric tube 30 including boron nitride. The dielectric tube 30 helps direct the plasma torch gas flow 22 through the waveguide 20 or 40, thus, the plasma 24 is sustained within the dielectric tube 30. Referring to FIG. 1, the dielectric tube 30 can be placed at the peak of the microwave field intensity, one quarter of the microwave energy 18 wavelength, $\frac{1}{4}\lambda_g$, back from the short 26. Now turning to FIG. 2, the dielectric tube 30 should penetrate the quasi-optical overmoded waveguide 40 at the peak microwave field intensity, where the back reflection is focused at the focus of the focusing mirror 42.

Referring to FIGS. 1 and 2, the gas 22 flows from at least one source (not shown) transversely through the waveguide 20 or 40 for plasma 24 generation. Of course, those skilled in the art will recognize that one possible gas source could be a jet and that means other than jets may be used to control the gas flow 22. The gases suitable for gas flow 22 are known in the art and can be any gas or mixture of gases such as air, nitrogen, argon, or other as required by the particular thermal process application. The gas flow 22 can be swirled by a swirl gas input 28 to center the plasma 24 in the area for plasma generation, preferably in the dielectric tube 30. The gas flow cools and protects the dielectric tube 30 from the plasma 24. Optionally, a gas input 32 provides a longitudinal flow through the waveguide 20 or 40. Preferably, at least one gas input 32 creates a longitudinal flow and at least one swirled gas input 28 creates a swirled flow centering the plasma 24 in the dielectric tube 30. The swirled gas input 28 can be located on the same end of the dielectric tube 30 as the gas input 32. The dielectric tube 30 can be eliminated if the gas flow 22 helps control placement of the plasma 24. One skilled in the art will realize that several methods are possible to center the plasma 24 including using a longitudinal flow surrounded by an annular gas flow that flows at a faster flow rate.

High power microwave induced plasmas as described with respect to FIGS. 1 and 2 can achieve the goal of clean, efficient, and reliable waste destruction with a very high degree of environmentally superior treatment by providing controlled, high temperature, noncombustion treatment for materials, including chemical hazards, radioactive materials, and municipal solid waste. Many new applications will also become possible such as compact waste-treatment systems for shipboard use being promulgated by new Environmental Protection Agency (EPA) and international regulations for clean harbors. Systems for destruction of fine particulate matter from combustion sources are also possible.

The high power microwave torch technology described with respect to FIGS. 1 and 2 can be retrofitted as an afterburner on many present incinerators and plasma furnaces, preserving the capital investment in these waste treatment facilities.

Figure 3:
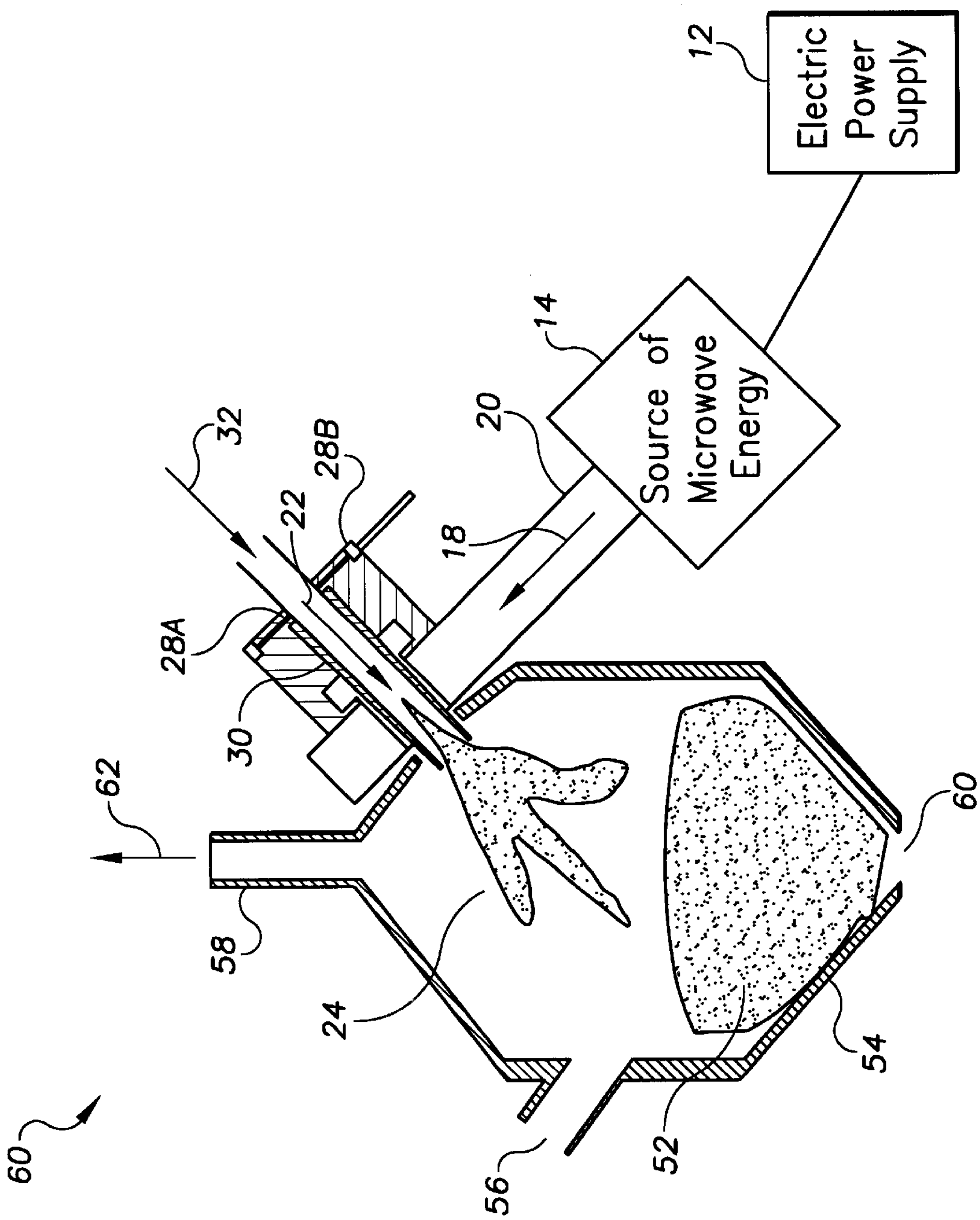
FIG. 3 is a cross-sectional view of a plasma torch furnace.

FIG. 3 illustrates one embodiment of a plasma torch furnace 50 having many applications including waste processing. A plasma torch, consistent with the embodiments described with respect to FIGS. 1 and 2, has a source of microwave energy 14, a shorted fundamental mode waveguide 20 having no structural restrictions effecting resonance between the source of microwave energy 14 and the plasma 24, and a gas flow 22. One skilled in the art will appreciate however, that embodiments of the invention are not limited to use of a fundamental mode waveguide 20, but rather, a quasi-optical overmoded waveguide 40 with its corresponding dimension limits based on the wavelength of the microwave energy 18 is possible. The waveguide 20 is configured such that at least 5 kilowatts of the microwave energy 18 are coupled into a gas flow 22 through the waveguide 20 to create a plasma 24. At least one plasma torch is mounted on a furnace chamber 54 such that the plasma 24 is directed into the chamber 54 where a material 52 is heated. The material 52 is introduced into the chamber 54 through a feed port 56 that can operate in either a batch or continuous mode. The material 52 is volatilized and/or melted by the extreme heat from the plasma 24. The furnace 50 can have an exhaust port 58 to allow off-gases 62 to escape. The chamber 54 can also have a pouring port 60 to pour off molten material 52. One or more microwave plasma torches can be combined and mounted on the furnace chamber 54 to provide more power as needed for a particular material 52 stream, as well as improve power distribution for complete and thorough material 52 destruction. In addition, one or more microwave plasma torches (not shown) could be mounted on the exhaust port 58 to ensure complete particulate matter destruction in the off-gasses 62.

Very high power microwave-induced plasma torch technology can be used in all thermal processes which require clean, controlled, high temperature processing such as production of ultra pure materials for the semiconductor and fiber optic industries, ceramic production, metallurgical processing, sintering, vitrification, surface treatments, and other thermal processes. The microwave plasma torch, therefore, has the potential to achieve a very large market in the manufacturing and environmental sectors.

Figure 4:
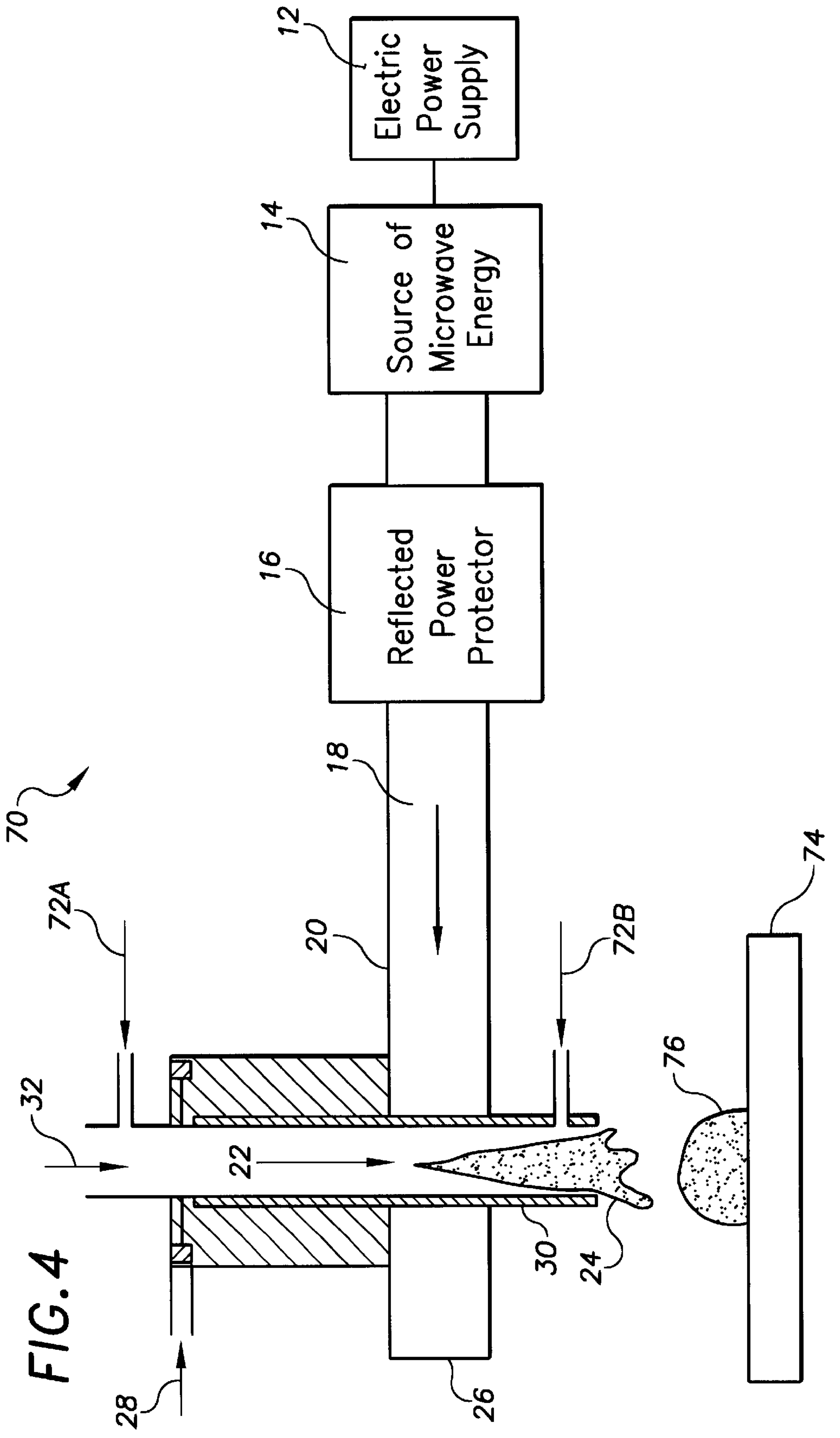
FIG. 4 is a cross-sectional view of a microwave plasma torch material and surface processing apparatus.

FIG. 4 illustrates a microwave plasma torch used in a surface and material processing apparatus 70. The plasma 24 is created and maintained as described with respect to FIGS. 1 and 2. Feed material is introduced into the plasma 24 through a feed port 72A near the gas flow 22 input or through a feed port 72B directly into the plasma 24. One skilled in the art will recognize that material can be fed into the plasma 24 through either feed port 72A or 72B or simultaneously. The feed material can be a solid, liquid, or gas or any combination of those material states. In a material processing mode, the feed material is processed in the plasma 24 and deposited in a product batch 76 or on a substrate 74. Examples of this application are crystal growth, production of ultra pure materials for optics and electronics, plasma sintering of ceramics, synthesis of ultra fine powders, and synthesis of chemicals such as titanium dioxide. If the processing apparatus 70 is used for surface processing, the plasma 24 is directed at the surface of the material to be treated 74 and the processed feed material (not shown) is deposited on the surface 74. Examples of this application are plasma spray coating and deposition of various metals such as Ni, Cr—Ni, Cu, Ti, W, Tin, and others. Applications listed are given by way of illustration.

Figure 5:
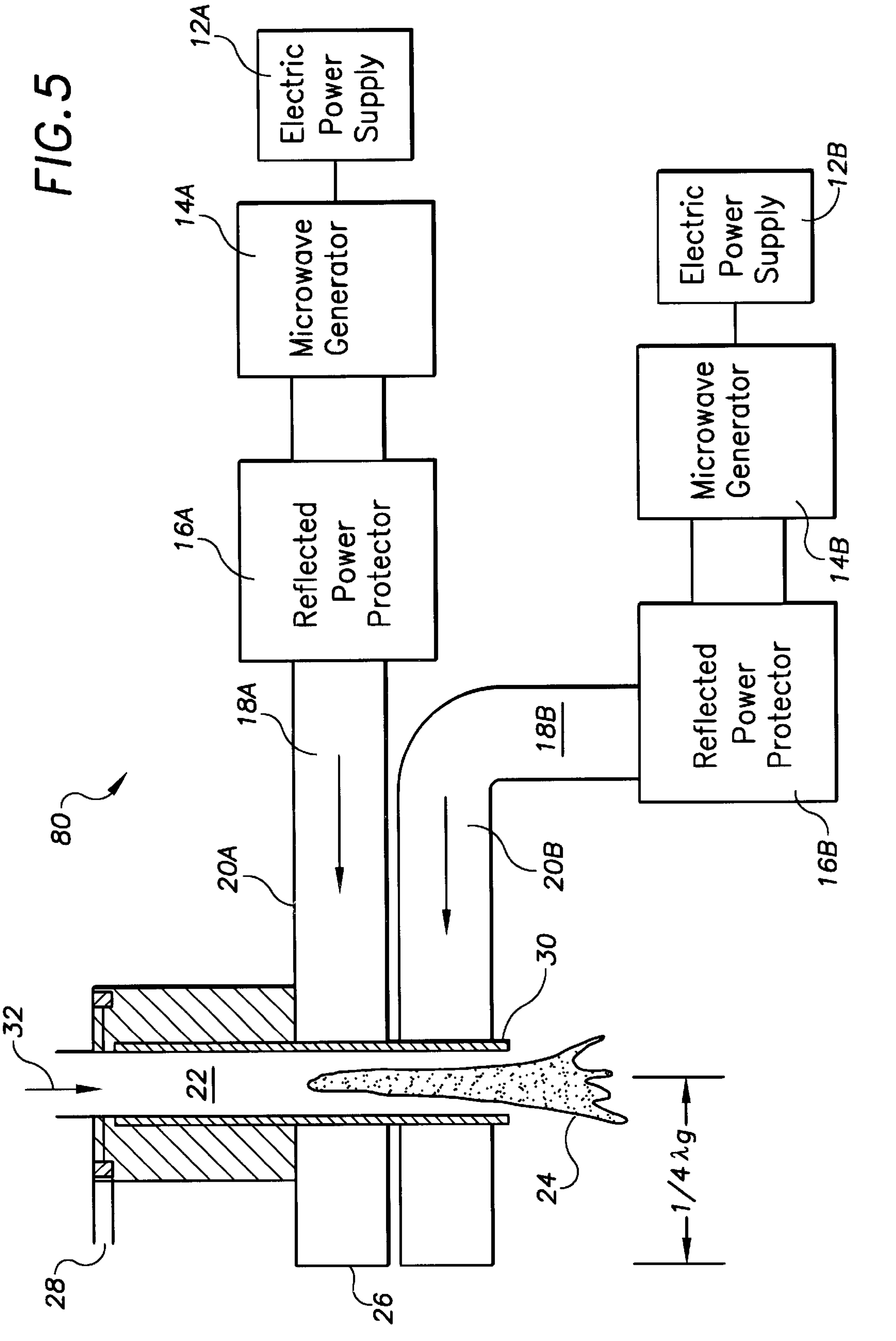
FIG. 5 is a cross-sectional view of a modular plasma torch.

Referring to FIG. 5, the plasma torches as described by FIGS. 1 and 2 can be integrated into a modular stack to create a modular plasma torch 80. At least two plasma torches, consistent with the embodiments described with respect to FIGS. 1 and 2, have sources of microwave energy 14A and 14B, shorted fundamental mode waveguides 20A and 20B, and a gas flow 22. One skilled in the art will appreciate however, that embodiments of the invention are not limited to use of a fundamental mode waveguide 20A and 20B, but rather, a quasi-optical overmoded waveguide 40 with its corresponding dimension limits based on the wavelength of the microwave energy 18 is possible. The stacking of multiple waveguides 20A and 20B integrated into a single dielectric tube 30 creates a columnar plasma 24. This embodiment allows very high power plasma 24 generation using economical and efficient sources of microwave energy 14A and 14B.

An example of possible parameters for a high power microwave plasma torch 10 uses a readily available 915 MHz magnetron source that can produce up to 100 kilowatts output power with conversion efficiency of more than 80%. A complete microwave source system, including power supply, at this frequency can be obtained at a cost of less than $1.00 per watt. The capital costs of this system would be very competitive with existing thermo-plasma treatment technologies. In this particular case, the fundamental waveguide 20 cross-section dimensions would be approximately 20×10 centimeters. The central hole in the wider waveguide walls through which the plasma 24 penetrates can have a diameter of approximately 8 centimeters.

While the invention has been particularly shown and described with reference to preferred embodiments, the foregoing and other changes in form and detail may be made therein by one skilled in the art without departing from the spirit or scope of the invention.

What is claimed is:

1. A plasma torch furnace, comprising:

(a) an enclosed furnace chamber including a feed port for introducing waste into the furnace chamber;

(b) at least one plasma torch disposed for heating the waste in the chamber, the plasma torch including a source of microwave energy; a waveguide for propagating the microwave energy, the waveguide having no structural restriction between the source and plasma to effect resonance; and a gas flowing through the waveguide, the waveguide configured such that an average of at least five kilowatts of the microwave energy is coupled into the gas to create a plasma, the plasma exiting the waveguide;

(c) an exhaust port through which off-gases escape; and (d) an additional plasma torch mounted on the exhaust port.

* * * * *